Sept. 15, 1936.     W. P. MERRILL     2,054,296
DUPLEX BROACHING MACHINE
Filed Feb. 8, 1935     2 Sheets-Sheet 2
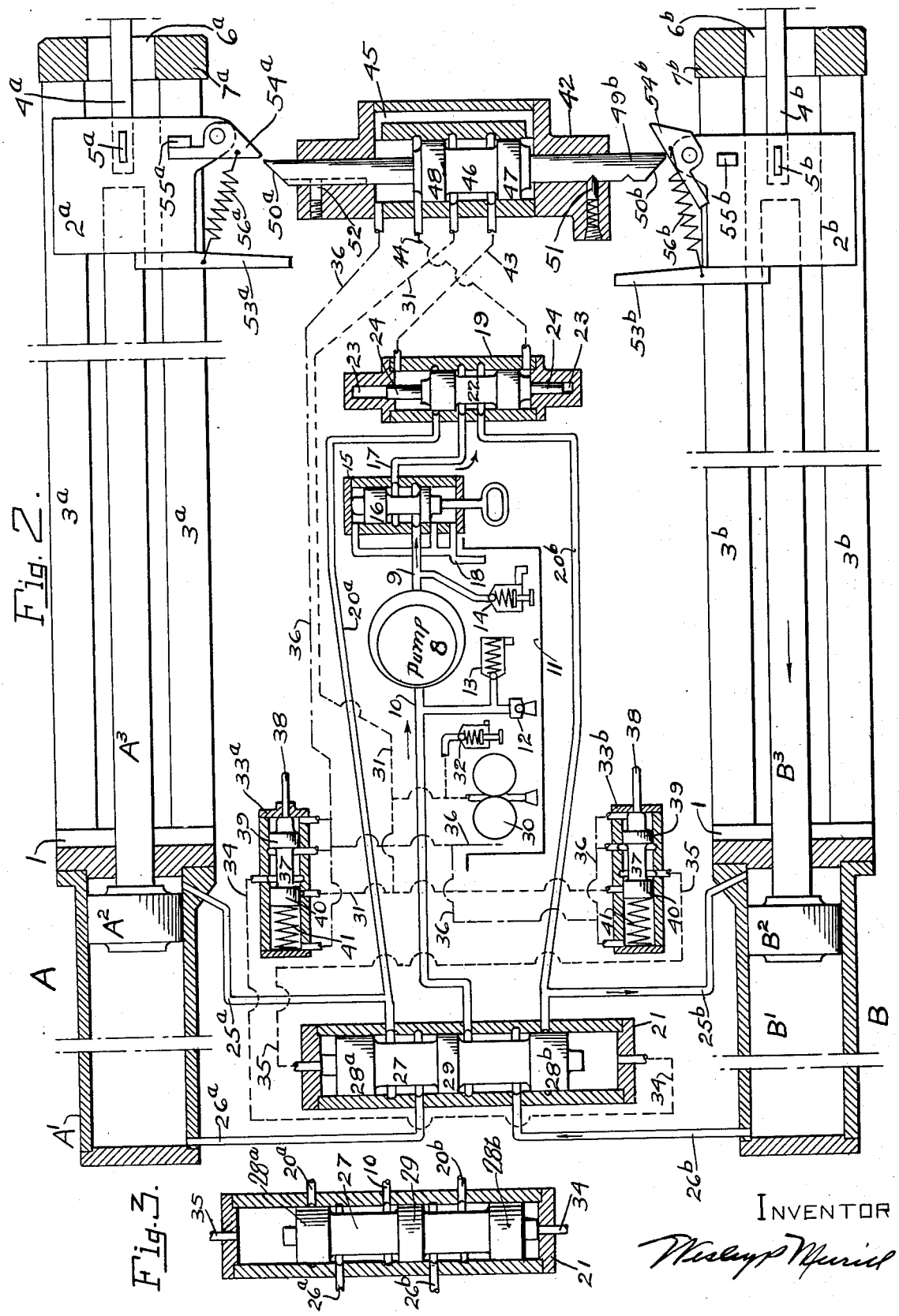
INVENTOR
Wesley P Merrill Patented Sept. 15, 1936

2,054,296

UNITED STATES PATENT OFFICE 2,054,296

DUPLEX BROACHING MACHINE

Wesley P. Merrill, Milwaukee, Wis., assignor to The Oilgear Company, Milwaukee, Wis., a corporation of Wisconsin Application February 8, 1935, Serial No. 5,512

19 Claims. (Cl. 60—52)

This invention relates to machine tools of the type in which two members are reciprocated alternately by hydraulic motors, such as a duplex or twin broaching machine of the general type shown in Patent No. 1,898,576.

In hydraulically operated broaching machines most commonly used, one motor ordinarily drives the tool on a cutting stroke at the same time that the other motor moves another tool on an idle or return stroke. The machine is ordinarily designed to automatically come to rest at the end of each stroke. During the return stroke, the operator disconnects the idle tool from the motor and, at the end of the return stroke, places a new piece of work in position, reconnects the tool to the motor and starts the machine.

The machine must thus stop at the end of each stroke unless the operator is exceptionally proficient and the work and the tool are so light in weight that he can disconnect the tool from the motor, withdraw it from the machine and place a new piece of work in position during the return stroke, and then reconnect the tool to the motor during the brief interval that the motor piston is at and near the end of its return stroke.

The present invention has as an object to provide a duplex machine which will allow ample loading time while operating continuously.

Another object is to provide an improved hydraulic drive for a duplex machine.

Another object is to provide a duplex machine in which each motor is operated in one direction at a cutting speed and in the opposite direction at high speed.

Other objects and advantages will be apparent from the description hereinafter given of a hydraulic drive in which the invention is embodied.

The invention is exemplified by the broaching machine shown schematically in the accompanying drawings in which the views are as follows:

Fig. 2 is a similar view showing the position of the parts just after the second motor has started on its working stroke.

Fig. 3 is a longitudinal sectional view of a reversing valve shown in Figs. 1 and 2 but with the plunger thereof in a different characteristic position.

Figure 1:
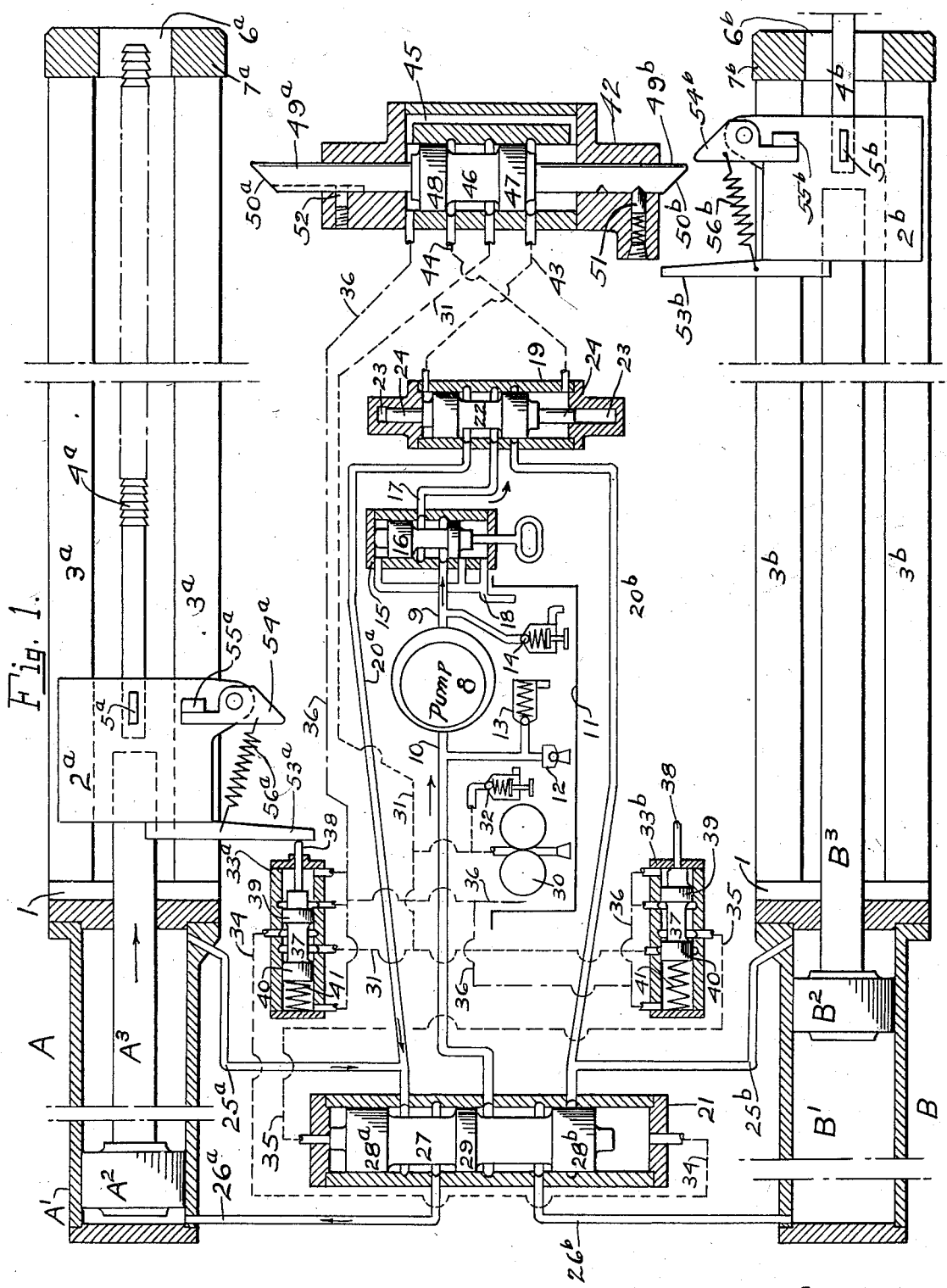
Fig. 1 is a diagram of a hydraulic circuit and shows the various parts in the positions occupied when one motor has just completed its working stroke and is about to start on its return stroke.

The frame and the details of construction of the machine have not been illustrated for the reason that duplex broaching machines are well known and in extensive use and for the further reason that the invention may be embodied in either a horizontal machine or in a vertical machine.

For the purpose of illustration, the invention is shown embodied in an internal broaching machine but it may as readily be embodied in an external or surface broaching machine.

The machine is provided with two reciprocating hydraulic motors A and B having the cylinders $A^1$ and $B^1$ thereof rigidly secured to or formed integral with the machine frame which is indicated by the reference numeral 1.

The motors A and B have pistons $A^2$ and $B^2$ fitted in the cylinders $A^1$ and $B^1$ respectively and connected by piston rods $A^3$ and $B^3$ to drawheads $2^a$ and $2^b$ mounted for reciprocation upon suitable guides $3^a$ and $3^b$ which may be ordinary ways formed on the frame 1 as shown in the drawings or may be cylindrical guides or rods which extend through the drawheads and are fastened at the ends thereof to the frame 1 as is common practice and as shown in the patent referred to above.

The drawheads $2^a$ and $2^b$ are adapted to have broaching tools $4^a$ and $4^b$ connected thereto as by means of keys $5^a$ and $5^b$. The tools $4^a$ and $4^b$ are reciprocated by the motors A and B through openings $6^a$ and $6^b$ formed in face plates $7^a$ and $7^b$ which are ordinarily integral with the frame 1.

When the machine is in operation, the thrust of the tool is taken by pressure plates (not shown) arranged upon the outer faces of the face plates and retained in position thereon by being bolted thereto or by having flanges which fit into the openings $6^a$ and $6^b$.

The motors A and B are driven by liquid supplied by a pump 8 which may be adjustable to vary the rate of delivery, such as the pump disclosed in application Serial No. 662,219 filed March 23, 1933, by Walter Ferris.

The pump 8 delivers its output into a pipe 9 and has liquid returned thereto through a pipe 10. A branch of the return pipe 10 extends downward into a reservoir 11 and has its lower end provided with a check valve 12 and a low pressure resistance valve 13 which are connected in parallel with each other and open in opposite directions. Whenever the pump discharges liquid at a rate greater than the rate at which liquid is returned thereto, it draws additional liquid from the reservoir 11 through the check valve 12 and, whenever liquid is returned to the pump at a rate greater than the rate at which liquid is discharged therefrom, the excess liquid is exhausted into the reservoir 11 through the resistance valve 13. The pressure created by the pump is limited by a high pressure relief valve 14 connected to the discharge pipe 9 and discharging into the reservoir 11.

The delivery of liquid from the pump 8 is controlled by a starting valve 15 to which the pipe 9 is connected intermediate the ends thereof. The flow of liquid through the valve 15 is controlled by a plunger 16 having two spaced apart heads which control communication between the pipe 9 and a pressure pipe 17 and between the pipe 9 and a drain pipe 18 which discharges into the reservoir 11. When the plunger 16 is in the position shown, the liquid discharged by the pump 8 will flow through the valve 15 into the pipe 17. When the plunger 16 is shifted downward in respect to Fig. 1, it will block the pipe 17 and open the pipe 9 to the drain pipe 18 to thereby short-circuit the pump and stop the machine.

The liquid delivered by the pump 8 is directed to the motors A and B selectively by a selector valve 19 which is connected by two pipes $20^a$ and $20^b$ to two annular grooves formed in the casing of a differential reversing valve 21 which directs liquid to one end or to both ends of each of the motor cylinders.

The pipe 17 is connected to the selector valve 19 between the pipes $20^a$ and $20^b$. Communication between the pipe 17 and the pipes $20^a$ and $20^b$ is controlled by a valve plunger 22. When the plunger 22 is in the position shown in Fig. 1, liquid from the pump 8 may flow through the pipe $20^a$ to operate the motor A. When the plunger 22 is shifted into the position shown in Fig. 2, liquid from the pump 8 may flow through the pipe $20^b$ to operate the motor B.

The selector valve 19 has a dashpot 23 arranged at each end of its casing and a small plunger 24 fixed upon each end of its plunger 22 and loosely fitted in a dashpot 23. When the plunger is shifted in one direction or the other, the liquid in a dashpot 23 must be squeezed out around the plunger 24, thereby delaying the action of the selector valve.

The gland or rod ends of the motor cylinders $A^1$ and $B^1$ are connected, respectively, to the pipes $20^a$ and $20^b$ by pipes $25^a$ and $25^b$. The head end of the cylinder $A^1$ is connected by a pipe $26^a$ to an annular groove formed in the casing of the reversing valve adjacent the groove to which the pipe $20^a$ is connected. The head end of the cylinder $B^1$ is connected by a pipe $26^b$ to an annular groove formed in the casing of the reversing valve 21 adjacent the groove to which the pipe $20^b$ is connected. The return pipe 10 is connected to a groove formed in the casing of the reversing valve 21 between the grooves to which the pipes $26^a$ and $26^b$ are connected.

The flow of liquid through the reversing valve 21 is controlled by its plunger 27 which has two end pistons $28^a$ and $28^b$ and a center piston 29 formed thereon and closely fitted in the valve casing to reciprocate therein. The head $28^a$ controls communication between the pipes $20^a$ and $26^a$, the head $28^b$ controls communication between the pipes $20^b$ and $26^b$, and the head 29 controls communication between pipe 10 and pipes $26^a$ and $26^b$.

With the selector valve plunger 22 and the reversing valve plunger 27 in the positions shown in Fig. 1, liquid from the pump 8 may flow through the selector valve 19, the pipe $20^a$, the reversing valve 21 and the pipe $26^a$ to the head end of the cylinder $A^1$ and move the piston $A^2$ toward the right on an idle stroke. The liquid ahead of the piston $A^2$ is expelled from the cylinder by the piston and flows through the pipe $25^a$, the reversing valve 21 and the pipe $26^a$ to the head end of the cylinder $A^1$ and augments the flow from the pump, thereby causing the piston $A^2$ to be driven on its idle stroke at high speed. Both ends of the cylinder $A^1$ are thus open at this time to pump pressure, but since the piston $A^2$ has a greater effective area upon its rear end than upon its front end due to the rod $A^3$, the liquid exerts a greater total force upon the rear end of the piston than upon the front end thereof and thereby moves it toward the right on an idle stroke.

The motor piston $B^2$ will be driven on its idle stroke in the same manner when the selector valve plunger 22 is in the position shown in Fig. 2 and the reversing valve plunger 27 is in the position shown in Fig. 3 for the reason that the output of the pump will flow through pipe $20^b$, the valve 21 and the pipe $26^b$ to the head end of the cylinder $B^1$ and the liquid discharged from the rod end of the cylinder $B^1$ will be expelled by the piston $B^2$ through the pipe $25^b$, the valve 21 and the pipe $26^b$ to the head end of the cylinder $B^1$.

With the selector valve plunger 22 and the reversing valve plunger 27 in the positions shown in Fig. 2, liquid from the pump may flow through the selector valve 19, the pipes $20^b$ and $25^b$ to the rod end of the cylinder $B^1$ and move the piston $B^2$ toward the left on a cutting stroke. The piston $B^2$ will expel liquid from the head end of the cylinder $B^1$ through the pipe $26^b$, the reversing valve 21, and the pipe 10 to the intake of the pump 8 which drives the piston $B^2$ toward the left at an appropriate cutting speed.

The motor piston $A^2$ will be driven on its cutting stroke in the same manner when the selector valve plunger 22 is in the position shown in Fig. 1 and the reversing valve plunger 27 is in the position shown in Fig. 3 for the reason that the output of the pump 8 will flow through pipes $20^a$ and $25^a$ to the rod end of the cylinder $A^1$ and the liquid discharged from the head end of the cylinder $A^1$ will be expelled by the piston $A^2$ through the pipe $26^a$ and the valve 21 into the return pipe 10.

The valves 19 and 21 are operated hydraulically by liquid supplied by a gear pump 30 which is ordinarily driven in unison with the pump 8 and arranged in the casing thereof. The gear pump 30 draws its supply of liquid from the reservoir 11 and discharges it into a low pressure supply pipe 31 having connected thereto a low pressure relief valve 32 which limits the pressure created by the gear pump and through which liquid supplied by the gear pump in excess of requirements is exhausted.

Operation of the reversing valve 21 is controlled by two pilot valves $33^a$ and $33^b$ to both of which the low pressure supply pipe 31 is connected intermediate the ends of each valve casing.

The reversing valve 21 has the B end of its casing connected by a pipe 34 to the casing of the pilot valve $33^a$ adjacent the point at which the pipe 31 is connected thereto and the A end of its casing connected by a pipe 35 to the casing of the pilot valve $33^b$ adjacent the point at which the supply pipe 31 is connected thereto.

Each of the pilot valves $33^a$ and $33^b$ has its casing connected at each end thereof and at a point adjacent its front or gland end to a drain pipe 36 which discharges into the reservoir 11.

The flow of liquid through each of the pilot valves $33^a$ and $33^b$ is controlled by its plunger 37 which has a stem 38 fixed thereto and extending through the front or gland end of the valve casing. The plunger 37 has two spaced apart heads 39 and 40 formed thereon and closely fitted in the casing to reciprocate therein. The head 39 controls communication between the drain pipe 36 and the pipe 34 or 35 which leads to the end of the casing of the reversing valve 21. The head 40 controls communication between the low pressure supply pipe 31 and the pipe 34 or 35.

Each plunger 37 is urged forward or toward the right and normally held against the front or gland end of the valve casing by a helical compression spring 41 arranged in the rear or head end of the valve casing. When the plungers 37 are retained in their normal forward positions by the spring 41, the flow of liquid from the low pressure supply pipe to the pilot valve is blocked by the heads 40 and both ends of the casing of the reversing valve 21 are open to the drain pipe 36 through the pipes 34 and 35 and the pilot valves.

The plunger 37 of the pilot valve 33$^a$ is urged rearward against the action of the spring 41 when the piston A$^2$ of the motor A approaches the end of its working stroke. With the plunger 37 in its rearward position as shown in Fig. 1, pipe 34 is open to supply pipe 31 and liquid may flow therethrough to the B end of the casing of the reversing valve 21 and move its plunger 27 upward or toward the A end to the position shown in Fig. 1, liquid being exhausted from the A end of the casing of the reversing valve 21 to the drain pipe 36 through the pipe 35 and the pilot valve 33$^b$ which at this time remains in its normal position.

The plunger 37 of the pilot valve 33$^b$ is urged rearward against the action of the spring 41 when the piston B$^2$ of the motor B approaches the end of its working stroke. With the plunger 37 in its rearward position, pipe 35 is open to supply pipe 31 and liquid may flow therethrough to the A end of the casing of the reversing valve 21 and move its plunger 27 downward or toward the B end to the position shown in Fig. 3, liquid being exhausted from the B end of the casing of the reversing valve 21 to the drain pipe 36 through the pipe 34 and the pilot valve 33$^a$ which at this time remains in its normal position.

Operation of the selector valve 19 is controlled by a pilot valve 42 to which the low pressure supply pipe 31 is connected intermediate the ends of the valve casing. The selector valve 19 has one end of its casing connected by a pipe 43 to the casing of the pilot valve 42 at one side of the pipe 31 and the other end of its casing connected by a pipe 44 to the casing of the pilot valve 42 at the other side of the pipe 31. The pilot valve casing has one of its ends connected to the drain pipe 36 and its other end connected thereto through a passage 45 formed in the wall of the casing.

The flow of liquid through the pilot valve 42 is controlled by its plunger 46 which has two heads 47 and 48 formed thereon and closely fitted in the casing to reciprocate therein and to control the pipes 43 and 44 respectively.

When the plunger 46 is in the position shown in Fig. 1, pipe 44 is open to supply pipe 31 and pipe 43 is open to the drain pipe 36 through the passage 45 so that liquid from the gear pump may enter the lower end of the casing of the selector valve and move its piston upward to the position shown in Fig. 1, and the plunger 22 may eject liquid from the casing through the pipe 43 and the pilot valve into the drain pipe 36. In this position of the plunger 22, the pump 8 may deliver liquid into the pipe 20$^a$ to operate the motor A.

When the plunger 46 is shifted to the position shown in Fig. 2, pipe 43 is open to supply pipe 31 and pipe 44 is open to the drain pipe 36 so that liquid from the gear pump may enter the upper end of the casing of the selector valve to move its plunger 22 downward to the position shown in Fig. 2, and the plunger 22 may eject liquid from the casing through the pipe 44 and the pilot valve into the drain pipe 36. In this position of the plunger 22, the pump 8 may deliver liquid into the pipe 20$^b$ to operate the motor B.

The plunger 46 is provided upon its ends with two stems 49$^a$ and 49$^b$ which extend through the ends of the valve casing and have formed upon the outer ends thereof cam faces 50$^a$ and 50$^b$ by means of which the plunger 46 is shifted into one position or the other when the piston of one motor or the other approaches the limit of its idle stroke.

The plunger 46 is retained in one or the other of its operative positions by a spring detent 51 arranged in the valve casing to engage one or the other of two suitable notches formed in the stem 49$^b$, and it is restrained from rotation by a key 52 arranged in the valve casing and engaging a suitable keyway formed in the outer part of the stem 49$^a$.

The valves of horizontal broaching machines are ordinarily operated by means arranged upon control rods which move with the tool and upon which the control means is adjustable in order to vary the stroke. For the purpose of illustration, however, the means for operating the pilot valves 33$^a$, 33$^b$ and 42 are shown arranged upon and movable with the drawheads 2$^a$ and 2$^b$.

As shown, the pilot valves 33$^a$ and 33$^b$ are operated by two arms 53$^a$ and 53$^b$ carried by the drawheads 2$^a$ and 2$^b$. The plunger 46 of the pilot valve 42 is shifted into one or the other of its operative positions by two cams 54$^a$ and 54$^b$ which are pivoted upon the drawheads 2$^a$ and 2$^b$ and restrained from movement in one direction by two stops 55$^a$ and 55$^b$ fixed to the drawheads 2$^a$ and 2$^b$. The cams 54$^a$ and 54$^b$ are held in operative positions against the stops by two springs 56$^a$ and 56$^b$ each of which has one end attached to the cam and its other end attached to the arm 53$^a$ or 53$^b$.

Assuming that the motor A has just completed its working stroke so that the arm 53$^a$ has engaged the stem 38 and operated the pilot valve 33$^a$, and that the plunger 16 of the starting valve 15 is in the position shown in Fig. 1, the machine will operate as follows:

The gear pump 30 will deliver liquid through the supply pipe 31, the pilot valve 33$^a$ and the pipe 34 to the B end of the reversing valve 21 and shift its plunger 27 to the position shown in Fig. 1. The pump 8 will then deliver liquid through the pipe 9, the starting valve 15, the pipe 17, the selector valve 19, the pipe 20$^a$, the reversing valve 21, and the pipe 26$^a$ to the head end of the motor A, and liquid will be exhausted from the gland end of the motor A through the pipe 25$^a$, the reversing valve 21 and the pipe 26$^a$ to the head end of the motor A, thereby causing the piston A$^2$ and the crosshead 2$^a$ to move to the right on an idle stroke at high speed. The spring 41 will then move the plunger 37 of the pilot valve 33$^a$ to its normal position.

As the piston A$^2$ approaches the limit of its idle stroke, the cam 54$^a$ will engage the cam face 50$^a$ on the stem 49$^a$ of the pilot valve 42 and shift the plunger 46 thereof to the position shown in Fig. 2. If desired, the notches in the stem 49$^b$ may be made large enough and the detent 51 provided with a spring strong enough to complete the shifting of the plunger 46 after it has been shifted part way by the cam 54$^a$ or 54$^b$. With the plunger 46 in the position shown in Fig. 2, the gear pump 30 will deliver liquid through the supply pipe 31, the pilot valve 42 and the pipe 43 to the upper end of the casing of the selector valve 19 and move its plunger 22 toward the position shown in Fig. 2. The movement of the piston 22 is retarded by the dashpot 23—24 so that the motor A continues to operate for a limited period of time after the pilot valve 42 has been operated, thereby moving the cam 54$^a$ beyond the stem 49$^a$.

After the plunger 22 of the selector valve 19 has moved far enough to open the pipe 20$^b$, the motor A stops and the output of the pump 8 is diverted through the pipes 20$^b$ and 25$^b$ to the gland end of the motor B, thereby moving the piston B$^2$ rearward on a working stroke and drawing the tool 4$^b$ through any work which may have been placed thereon in contact with the face plate 6$^b$. Liquid is exhausted from the rear end of the cylinder B$^1$ through the pipe 26$^b$, the reversing valve 21 and the return pipe 10 to the pump 8. Since the volume returned to the pump is greater than the volume being supplied by the pump to the right end of the cylinder B$^1$, the excess liquid is exhausted through the low pressure resistance valve 13.

Just after the crosshead 2$^b$ starts on its working stroke, the cam 54$^b$ engages the valve stem 49$^b$, turns upon its pivot against the resistance of the spring 56$^b$ and passes beyond the stem 49$^b$, the detent 51 preventing the plunger 46 from becoming displaced.

When the piston B$^2$ approaches the end of its working stroke, the arm 53$^b$ engages the stem 38 and operates the pilot valve 33$^b$, thereby permitting the gear pump 30 to deliver liquid through the pipe 31, the pilot valve 33$^b$, and the pipe 35 to the A end of the reversing valve 21 to shift its plunger 27 to the position shown in Fig. 3.

Both ends of the cylinder B$^1$ are now open to the pump 8 and the piston B$^2$ is moved to the right on an idle stroke at high speed, as previously explained in connection with motor A, and the spring 41 returns the plunger 37 of the valve 33$^b$ to its normal position as soon as the crosshead 2$^b$ has moved a short distance.

As the piston B$^2$ approaches the limit of its idle stroke, the cam 54$^b$ engages the cam face 50$^b$ on the valve stem 49$^b$ and shifts the plunger of the pilot valve 42 to the position shown in Fig. 1, thereby opening the lower end of the casing of the selector valve 19 to the supply pipe 31 to permit the gear pump liquid to shift the plunger 22 to the position shown in Fig. 1. As previously explained, the plunger 22 moves slowly so that the cam 54$^b$ is permitted to pass beyond the valve stem 49$^b$ of the pilot valve 42 before the plunger 22 has moved far enough to divert the output of the pump 8 from the pipe 20$^b$ into the pipe 20$^a$ and thereby stop the motor B.

The pump 8 may then deliver liquid through the pipes 20$^a$ and 25$^a$ to the gland end of the motor A and move the piston A$^2$ to the left on a working stroke, the cam 54$^a$ turning upon its pivot as it passes the end of the valve stem 49$^a$ as previously explained in connection with the cam 54$^b$.

As the piston A$^2$ approaches the end of its working stroke, the arm 53$^a$ operates the pilot valve 33$^a$ to initiate the second cycle of operation. The machine thus operates continuously until stopped by either shifting the starting valve 15 or by stopping the pump.

The invention herein set forth is susceptible of various modifications and adaptations without departing from the scope thereof as hereafter claimed.

The invention is hereby claimed as follows:

1. In a machine tool or the like, the combination of two motor cylinders, a piston fitted in each cylinder to reciprocate therein, a pump for supplying liquid to said cylinders alternately to reciprocate said pistons alternately, means responsive to each piston reaching a predetermined point in its movement in one direction for diverting the supply of liquid from its cylinder to the other cylinder to thereby cause the other piston to be actuated, and means responsive to each piston reaching a predetermined point in its movement in the opposite direction for causing its direction of movement to be reversed.

2. In a machine tool or the like, the combination of two reciprocating hydraulic motors each having a piston reciprocable in a cylinder, a pump for supplying liquid to said motors to operate the same alternately, means responsive to the piston of each motor reaching a predetermined point in its movement in one direction for diverting the liquid from that motor to the other motor to cause the same to be operated, valve means for reversing said motors, and means responsive to the piston of each motor reaching a predetermined point in its movement in the opposite direction for operating said valve means to thereby reverse the motor then operating.

3. In a machine tool or the like, the combination of two reciprocating hydraulic motors each having a piston reciprocable in a cylinder, a pump for supplying liquid to said motors to operate the same alternately, means responsive to the piston of each motor reaching a predetermined point in its movement in one direction for diverting the liquid from that motor to the other motor to cause the same to be operated, hydraulically operated valve means for reversing said motors, pilot valve means for controlling said reversing valve means, and means responsive to the piston of each motor reaching a predetermined point in its movement in the opposite direction for operating said pilot valve means to thereby reverse the motor then operating.

4. In a machine tool or the like, the combination of two reciprocating hydraulic motors each having a piston reciprocable in a cylinder, a pump for supplying liquid to said motors to operate the same alternately, a selector valve for directing said liquor to one motor or the other selectively, means responsive to the piston of each motor reaching a predetermined point in its movement in one direction for operating said selector valve to thereby divert the liquid from that motor to the other motor to cause the same to be operated, and means responsive to the piston of each motor reaching a predetermined point in its movement in the opposite direction for causing its motor to be reversed.

5. In a machine tool or the like, the combination of two reciprocating hydraulic motors each having a piston reciprocable in a cylinder, a pump for supplying liquid to said motors to operate the same alternately, a selector valve for directing said liquid to one motor or the other selectively, means responsive to the piston of each motor reaching a predetermined point in its movement in one direction for operating said selector valve to thereby divert the liquid from that motor to the other motor to cause the same to be operated, valve means for reversing said motors, and means responsive to the piston of each motor reaching a predetermined point in its movement in the opposite direction for operating said valve means to thereby reverse the motor then operating.

6. In a machine tool or the like, the combination of two reciprocating hydraulic motors each having a piston reciprocable in a cylinder, a pump for supplying liquid to said motors to operate the same alternately, a selector valve for directing said liquid to one motor or the other selectively, means responsive to the piston of each motor reaching a predetermined point in its movement in one direction for operating said selector valve to thereby divert the liquid from that motor to the other motor to cause the same to be operated, hydraulically operated valve means for reversing said motors, pilot valve means for controlling said reversing valve means, and means responsive to the piston of each motor reaching a predetermined point in its movement in the opposite direction for operating said pilot valve means to thereby reverse the motor then operating.

7. In a machine tool or the like, the combination of two reciprocating hydraulic motors each having a piston reciprocable in a cylinder, a pump for supplying liquid to said motors to operate the same alternately, a hydraulically operated selector valve for directing said liquid to one motor or the other selectively, a pilot valve for controlling said selector valve, means responsive to the piston of each motor reaching a predetermined point in its movement in one direction for operating said pilot valve to cause said selector valve to divert the liquid from the active motor to the other motor to cause the same to be operated, and means responsive to the piston of each motor reaching a predetermined point in its movement in the opposite direction for causing its direction of movement to be reversed.

8. In a machine tool or the like, the combination of two reciprocating hydraulic motors each having a piston reciprocable in a cylinder, a pump for supplying liquid to said motors to operate the same alternately, a hydraulically operated selector valve for directing said liquid to one motor or the other selectively, a pilot valve for controlling said selector valve, means responsive to the piston of each motor reaching a predetermined point in its movement in one direction for operating said pilot valve to cause said selector valve to divert the liquid from the active motor to the other motor to cause the same to be operated, valve means for reversing said motors, and means responsive to the piston of each motor reaching a predetermined point in its movement in the opposite direction for operating said valve means to thereby reverse the motor then operating.

9. In a machine tool or the like, the combination of two reciprocating hydraulic motors each having a piston reciprocable in a cylinder, a pump for supplying liquid to said motors to operate the same alternately, a hydraulically operated selector valve for directing said liquid to one motor or the other selectively, a pilot valve for controlling said selector valve, means responsive to the piston of each motor reaching a predetermined point in its movement in one direction for operating said pilot valve to cause said selector valve to divert the liquid from that motor to the other motor to cause the same to be operated, hydraulically operated valve means for reversing said motors, pilot valve means for controlling said reversing valve means, and means responsive to the piston of each motor reaching a predetermined point in its movement in the opposite direction for operating said pilot valve means to thereby reverse the motor then operating.

10. In a machine tool or the like, the combination of two reciprocating hydraulic motors each having a piston reciprocable in a cylinder, a pump for supplying liquid to said motors to operate the same alternately, a hydraulically operated selector valve for directing said liquid to one motor or the other selectively, a pilot valve for controlling said selector valve, means responsive to the piston of each motor reaching a predetermined point in its movement in one direction for operating said pilot valve to cause said selector valve to divert the liquid from that motor to the other motor to cause the same to be operated, means for delaying the action of said selector valve to permit said piston to move a limited distance after said pilot valve is actuated, valve means for reversing said motors, and means responsive to the piston of each motor reaching a predetermined point in its movement in the opposite direction for operating said valve means to thereby reverse the motor then operating.

11. In a machine tool or the like, the combination of two reciprocating hydraulic motors each having a piston reciprocable in a cylinder, a pump for supplying liquid to said motors to operate the same alternately, a hydraulically operated selector valve for directing said liquid to one motor or the other selectively, a pilot valve for controlling said selector valve, means responsive to the piston of each motor reaching a predetermined point in its movement in one direction for operating said pilot valve to cause said selector valve to divert the liquid from that motor to the other motor to cause the same to be operated, means for delaying the action of said selector valve to permit said piston to move a limited distance after said pilot valve is actuated, hydraulically operated valve means for reversing said motors, pilot valve means for controlling said reversing valve means, and means responsive to the piston of each motor reaching a predetermined point in its movement in the opposite direction for operating said pilot valve means to thereby reverse the motor then operating.

12. In a machine tool or the like, the combination of two reciprocating hydraulic motors each having a piston reciprocable in a cylinder, a pump for supplying liquid to said motors to operate the same alternately, means responsive to the piston of each motor reaching a predetermined point in its movement in one direction for diverting the liquid from the active motor to the other motor to cause the same to be operated, a differential reversing valve for alternatively connecting one end or both ends of each of said motors to said pump to thereby cause each motor to be operated in one direction or the other, and means responsive to the piston of each motor reaching a predetermined point in its movement in the opposite direction for operating said reversing valve to thereby reverse the motor then operating.

13. In a machine tool or the like, the combination of two reciprocating hydraulic motors each having a piston reciprocable in a cylinder, a pump for supplying liquid to said motors to operate the same alternately, a selector valve for directing said liquid to one motor or the other selectively, means responsive to the piston of each motor reaching a predetermined point in its movement in one direction for operating said selector valve to thereby divert the liquid from the active motor to the other motor to cause the same to be operated, a differential reversing valve for alternatively connecting one end or both ends of each of said motors to said pump to thereby cause each motor to be operated in one direction or the other, and means responsive to the piston of each motor reaching a predetermined point in its movement in the opposite direction for operating said reversing valve to thereby reverse the motor then operating.

14. In a machine tool or the like, the combination of two reciprocating hydraulic motors each having a piston reciprocable in a cylinder, a pump for supplying liquid to said motors to operate the same alternately, a hydraulically operated selector valve for directing said liquid to one motor or the other selectively, a pilot valve for controlling said selector valve, means responsive to the piston of each motor reaching a predetermined point in its movement in one direction for operating said pilot valve to cause said selector valve to divert the liquid from the active motor to the other motor to operate the same, a differential reversing valve for alternatively connecting one end or both ends of each of said motors to said pump to thereby cause each motor to be operated in one direction or the other, and means responsive to the piston of each motor reaching a predetermined point in its movement in the opposite direction for operating said reversing valve to thereby reverse the motor then operating.

15. In a machine tool or the like, the combination of two reciprocating hydraulic motors each having a piston reciprocable in a cylinder, a pump for supplying liquid to said motors to operate the same alternately, a hydraulically operated selector valve for directing said liquid to one motor or the other selectively, a pilot valve for controlling said selector valve, means responsive to the piston of each motor reaching a predetermined point in its movement in one direction for operating said pilot valve to cause said selector valve to divert the liquid from the active motor to the other motor to operate the same, means for delaying the action of said selector valve to permit said piston to move a limited distance after said pilot valve has been operated, a differential reversing valve for alternatively connecting one end or both ends of each of said motors to said pump to thereby cause each motor to be operated in one direction or the other, and means responsive to the piston of each motor reaching a predetermined point in its movement in the opposite direction for operating said reversing valve to thereby reverse the motor then operating.

16. In a machine tool or the like, the combination of two reciprocating hydraulic motors each having a piston reciprocable in a cylinder, a pump for supplying liquid to said motors to operate the same alternately, means responsive to the piston of each motor reaching a predetermined point in its movement in one direction for diverting the liquid from that motor to the other motor to cause the same to be operated, a hydraulically operated differential reversing valve for alternatively connecting one end or both ends of each of said motors to said pump to thereby cause each motor to be operated in one direction or the other, pilot valve means for controlling said reversing valve, and means responsive to the piston of each motor reaching a predetermined point in its movement in the opposite direction for operating said pilot valve means to thereby reverse the motor then operating.

17. In a machine tool or the like, the combination of two reciprocating hydraulic motors each having a piston reciprocable in a cylinder, a pump for supplying liquid to said motors to operate the same alternately, a selector valve for directing said liquid to one motor or the other selectively, means responsive to the piston of each motor reaching a predetermined point in its movement in one direction for operating said selector valve to thereby divert the liquid from that motor to the other motor to cause the same to be operated, a hydraulically operated differential reversing valve for alternatively connecting one end or both ends of each of said motors to said pump to thereby cause each motor to be operated in one direction or the other, pilot valve means for controlling said reversing valve, and means responsive to the piston of each motor reaching a predetermined point in its movement in the opposite direction for operating said pilot valve means to thereby reverse the motor then operating.

18. In a machine tool or the like, the combination of two reciprocating hydraulic motors each having a piston reciprocable in a cylinder, a pump for supplying liquid to said motors to operate the same alternately, a hydraulically operated selector valve for directing said liquid to one motor or the other selectively, a pilot valve for controlling said selector valve, means responsive to the piston of each motor reaching a predetermined point in its movement in one direction for operating said pilot valve to cause said selector valve to divert the liquid from that motor to the other motor to operate the same, a hydraulically operated differential reversing valve for alternatively connecting one end or both ends of each of said motors to said pump to thereby cause each motor to be operated in one direction or the other, pilot valve means for controlling said reversing valve, and means responsive to the piston of each motor reaching a predetermined point in its movement in the opposite direction for operating said pilot valve means to thereby reverse the motor then operating.

19. In a machine tool or the like, the combination of two reciprocating hydraulic motors each having a piston reciprocable in a cylinder, a pump for supplying liquid to said motors to operate the same alternately, a hydraulically operated selector valve for directing said liquid to one motor or the other selectively, a pilot valve for controlling said selector valve, means responsive to the piston of each motor reaching a predetermined point in its movement in one direction for operating said pilot valve to cause said selector valve to divert the liquid from that motor to the other motor to operate the same, means for delaying the action of said selector valve to permit said piston to move a limited distance after said pilot valve has been operated, a hydraulically operated differential reversing valve for alternatively connecting one end or both ends of each of said motors to said pump to thereby cause each motor to be operated in one direction or the other, pilot valve means for controlling said reversing valve, and means responsive to the piston of each motor reaching a predetermined point in its movement in the opposite direction for operating said pilot valve means to thereby reverse the motor then operating.

WESLEY P. MERRILL.